United States Patent
Lee

(10) Patent No.: US 12,046,933 B2
(45) Date of Patent: Jul. 23, 2024

(54) POWER SOLUTION CRADLE DOCK

(71) Applicant: Yuyi Lee, La Palma, CA (US)

(72) Inventor: Yuyi Lee, La Palma, CA (US)

( * ) Notice: Subject to any disclaimer, the term of this patent is extended or adjusted under 35 U.S.C. 154(b) by 308 days.

(21) Appl. No.: 17/196,834

(22) Filed: Mar. 9, 2021

(65) Prior Publication Data

US 2022/0294240 A1 Sep. 15, 2022

(51) Int. Cl.
| | | |
|---|---|---|
| *H02J 7/00* | (2006.01) | |
| *G06F 1/16* | (2006.01) | |
| *H01R 13/518* | (2006.01) | |
| *H01R 27/02* | (2006.01) | |
| *H04M 1/04* | (2006.01) | |
| *H01R 24/76* | (2011.01) | |

(52) U.S. Cl.
CPC .......... *H02J 7/0042* (2013.01); *G06F 1/1632* (2013.01); *H01R 13/518* (2013.01); *H01R 27/02* (2013.01); *H04M 1/04* (2013.01); *H01R 24/76* (2013.01)

(58) Field of Classification Search
CPC ..... H02J 7/0042; H02J 7/0044; G06F 1/1632; G06F 1/1626; H01R 13/518; H01R 27/02; H01R 24/76; H01R 25/003; H04M 1/72409; H04M 1/04
USPC ....................................................... 320/107
See application file for complete search history.

(56) References Cited

U.S. PATENT DOCUMENTS

| | | | | |
|---|---|---|---|---|
| 5,234,108 | A * | 8/1993 | Jorgensen | A45C 11/36 206/214 |
| 8,888,513 | B2 * | 11/2014 | Shi | H01R 13/44 439/131 |
| 10,994,147 | B2 * | 5/2021 | Scott | A61N 1/375 |
| 2004/0069920 | A1 * | 4/2004 | W. Dirks | H02G 3/18 248/51 |
| 2008/0012536 | A1 * | 1/2008 | Glass | H02J 7/0044 320/165 |
| 2009/0295328 | A1 * | 12/2009 | Griffin, Jr. | H02J 7/0044 455/113 |
| 2010/0000391 | A1 * | 1/2010 | Mohamed | B26D 1/025 83/856 |
| 2011/0089798 | A1 * | 4/2011 | Shapiro | A47B 97/00 312/348.3 |

(Continued)

FOREIGN PATENT DOCUMENTS

| | | | | |
|---|---|---|---|---|
| BR | 202019014414 U2 * | 1/2021 | | H01R 27/02 |
| CN | 2862809 Y * | 1/2007 | | |

(Continued)

*Primary Examiner* — Eric D Lee
(74) *Attorney, Agent, or Firm* — John D. Tran; Rhema Law Group

(57) ABSTRACT

Embodiments disclosed herein relate to power solution cradle dock system. The system can include a power solution cradle dock configured at a first position in a medium. The system can also include a cover positioned over the cradle dock at a second position in the medium. The cover is positioned over the cradle dock to provide protection for the cradle dock. The cover can be configured in a U-like shape to hold one or more devices and/or items. The cover can also provide a position to enable the one or more devices to be held securely and receive power. The system can also include a plurality of outlets configured to assist the cradle dock and the cover and provide power to the one or more devices and/or items secured over the cover.

20 Claims, 4 Drawing Sheets

(56) References Cited

U.S. PATENT DOCUMENTS

| | | | | |
|---|---|---|---|---|
| 2011/0187323 | A1* | 8/2011 | Gourley | H02J 7/0044 320/111 |
| 2011/0227535 | A1* | 9/2011 | Caskey | H01R 35/04 320/111 |
| 2012/0007555 | A1* | 1/2012 | Bukow | H02J 7/0044 320/110 |
| 2013/0309901 | A1* | 11/2013 | Hilbourne | G06F 1/1632 439/502 |
| 2015/0018049 | A1* | 1/2015 | Baschnagel | H04B 1/3883 455/573 |
| 2015/0129722 | A1* | 5/2015 | Green | H02J 7/0044 248/51 |
| 2016/0081207 | A1* | 3/2016 | Broadbent | G01C 21/265 361/807 |
| 2021/0170784 | A1* | 6/2021 | Wegner | A44C 21/00 |
| 2023/0210453 | A1* | 7/2023 | Brawn | A61C 7/00 433/6 |

FOREIGN PATENT DOCUMENTS

| | | | | |
|---|---|---|---|---|
| CN | 205810333 | U | * 12/2016 | |
| CN | 207316850 | U | * 5/2018 | |
| CN | 108365662 | A | * 8/2018 | H02J 50/10 |
| CN | 207895522 | U | * 9/2018 | |
| CN | 209305687 | U | * 8/2019 | |
| CN | 210926526 | U | * 7/2020 | |
| CN | 112134320 | A | * 12/2020 | |
| CN | 212056800 | U | * 12/2020 | |
| CN | 112290632 | A | * 1/2021 | |
| JP | 2005011780 | A | * 1/2005 | |
| JP | 2006186635 | A | * 7/2006 | |
| JP | 2010282601 | A | * 12/2010 | |
| JP | 3189562 | U | * 3/2014 | |

\* cited by examiner

POWER SOLUTION CRADLE DOCK

TECHNICAL FIELD

The present disclosure generally relates to a power solution cradle dock system. More specifically, the present invention provides a power solution cradle dock system for storing items and mobile devices and charging mobile devices.

BACKGROUND

Storing and charging mobile devices often requires storing the mobile device on the ground while a charging cord is connected to a power outlet in the wall. Further, charging and storing mobile devices can also include place a charging station on the ground, and placing the mobile device on the ground within the charging station as the charging station is connected to a power outlet within a wall.

Current charging stations typically do not hold items other than mobile devices. Items such as coins, wallets, and keys are not typically placed on charging stations due to the shape of the cover or overall shape of charging stations that are configured to only hold and charge mobile devices. As such, current charging stations are unable to hold everyday items such as wallets and keys and coins.

Power outlets are also apart from the charging stations as most power outlets are found within walls of buildings as such. Users looking to charge the mobile device need to attach power cords form the mobile device to power outlets located on the wall.

Therefore, having a charging station with the ability to safely store mobile devices while the mobile devices are being charged using power outlets configured within the charging station can be of great benefits to users of the charging station. In addition, it would also be very beneficial to users if charging stations are able to adapt and have different shapes of covers to enable items such as keys and coins to be safely stored without falling off of the station in addition to being able to safely store and charge mobile devices.

SUMMARY

An embodiment relates to a system comprising: a power solution cradle dock (cradle dock) configured at a first position in a medium. The system also includes a cover positioned over the cradle dock at a second position in the medium. The cover is positioned over the cradle dock to provide protection for the cradle dock. The cover is configured in a U-like shape to hold one or more devices and/or items. The cover provides a position to enable the one or more devices to be held securely and receive power. The system also includes a plurality of outlets configured to assist the cradle dock and the cover and provide power to the one or more devices and/or items secured over the cover.

In the system, one or more items, such as coins, keys, or smaller pocket-sized items can be positioned on the cover.

A top portion of the cover is configured to be curved.

The cover can also be configured to be removable from the cradle dock.

An embodiment relates to a system comprising: a cover configured in a U-Like shaped like cavity in a device. The cover is configured over a power solution cradle dock to provide protection to the power solution cradle dock. The cover is configured to hold and/or store one or more items and/or devices. The cover is configured to be able to be interchangeable with an additional cover and/or work with the additional cover. The power solution cradle dock is configured under the cover to be protected by the cover and provide power to the one or more devices and items positioned on the cover. The system also includes a plurality of outlets configured within the power solution cradle dock to enable the power solution cradle dock to provide power to the one or more devices and items on the cover.

The U-like shaped cavity of the cover enables the one or more devices to be positioned at any position within the U-like shaped cavity.

A top portion of the cover can be configured to be curved to hold smaller pocket-sized items such as coins and keys or other similar sized items.

The cover is combined with the additional cover and/or replaced with the additional cover over the power solution cradle dock.

The cover is removable from its position over the power solution cradle dock to enable the power solution cradle dock to be configured without the U-like shaped cavity.

A method comprises configuring a power solution cradle dock at a first position in a medium. The method also includes positioning a cover at a second position in the medium. The cover is positioned over the power solution cradle dock to provide protection for the power solution cradle dock The cover is configured in a U-like shape to hold one or more devices and/or items. The cover provides a position to enable the one or more devices to be held securely and receive power. The method also includes configuring a plurality of outlets to assist the power solution cradle dock and the cover to provide power to the one or more devices and/or items secured over the cover.

The method includes configuring one or more coins and one or more keys on the cover.

The U-like shape of the cover provides one or more positions to place the one or more devices on the cover.

The one or more devices are positioned on the U-like shape of the cover and one or more devices are positioned in a middle portion of the cover.

Another cover is configured over the power solution cradle dock, wherein the other cover does not include a U-like shaped area.

Other contemplated embodiments can include objects, features, aspects, and advantages in addition to or in place of those mentioned above. These objects, features, aspects, and advantages of the embodiments will become more apparent from the following detailed description, along with the accompanying drawings.

BRIEF DESCRIPTION OF THE FIGURES

A power solution cradle dock system comprising a cover configured in a U-like cradle shaped cavity in a device. The cover is configured over a power solution cradle dock to provide protection to the power solution cradle dock and also be able to hold and/or dock a digital device like a mobile phone within the U-like cradle shaped cavity. The cover is configured to be able to be interchangeable with a variety of different shapes and sizes which provides different functionality. The system also includes a plurality of outlets configured within the power solution cradle dock to enable the power solution cradle dock to provide power to the one or more devices and items on the cover.

Figure 1:
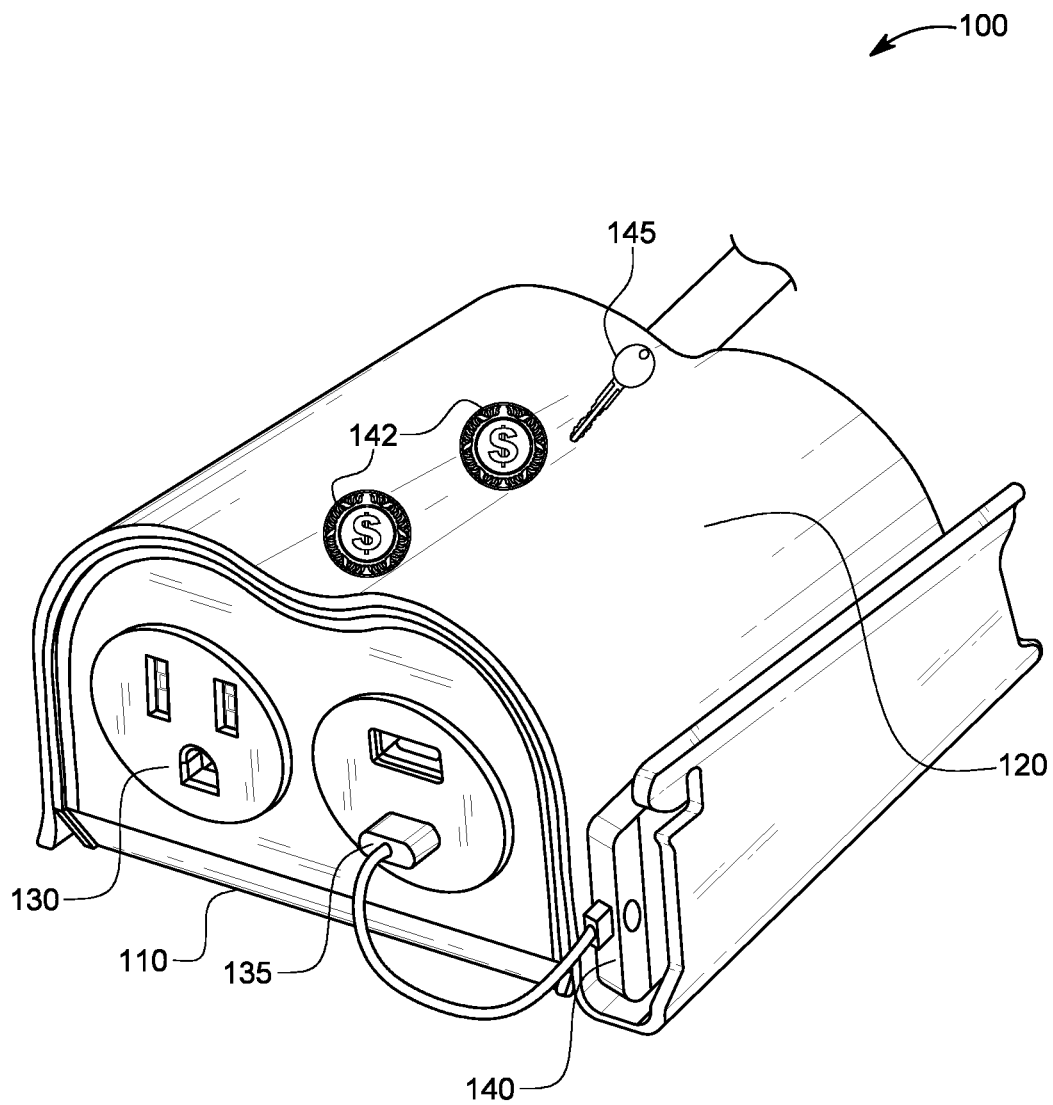
FIG. 1 illustrates exemplary diagrams of a power solution cradle dock system in accordance with an embodiment of the presently disclosed embodiments.

Unless otherwise indicated illustrations in the figures are not necessarily drawn to scale.

DETAILED DESCRIPTION OF SOME EMBODIMENTS

Background and Context

The disclosed embodiments are best understood by reference to the Figures and detailed description herein.

Disclosed embodiments of the invention are discussed below with reference to the Figures. However, those skilled in the art will appreciate that the detailed description provided herein with respect to these figures is for explanatory purposes as the invention may extends beyond these currently disclosed embodiments. Various alternate approaches to implement the functionality of any given detail described herein is envisioned. That is, there are modifications and variations of the invention that are too numerous to be listed but that all fit within the scope of the invention. Also, singular words should be read as plural and vice-versa, where appropriate, and alternative embodiments do not imply mutual exclusivity.

It is to be further understood that the disclosed embodiments are not necessarily limited to the particular methodology, techniques, uses, and applications, described herein, as these may vary. It is also to be understood that the terminology used herein is used for the purpose of describing particular embodiments only, and is not otherwise intended to limit the scope of the present invention. It must be noted that as used herein in the detailed description and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Physical and/or conceptual structures described herein are to be understood also to refer to functional equivalents of such structures.

All words of approximation as used in the present disclosure and claims should be construed to mean "approximate," rather than "perfect". Words of approximation, include, yet are not limited to terms such as "substantial", "nearly", "almost", "about", "generally", "largely", etc.

Terms of degree are not necessarily indefinite. "Claim language employing terms of degree has long been found definite where it provided enough certainty to one of skill in the art when read in the context of the invention." *Interval Licensing LLC v. AOL, Inc.*, 766 F.3d 1364, 1370, 112 USPQ2d 1188, 1192-93 (Fed. Cir. 2014) (citing *Fibel Process Co. v. Minnesota & Ontario Paper Co.*, 261 U.S. 45, 65-66 (1923). Thus, when a term of degree is used in the claim, the examiner should determine whether the specification provides some standard for measuring that degree. *Hearing Components, Inc. v. Shure Inc.*, 600 F.3d 1357, 1367, 94 USPQ2d 1385, 1391 (Fed. Cir. 2010); *Enzo Biochem, Inc., v. Applera Corp.*, 599 F.3d 1325, 1332, 94 USPQ2d 1321, 1326 (Fed. Cir. 2010); *Seattle Box Co., Inc. v. Indus. Crating & Packing, Inc.*, 731 F.2d 818, 826, 221 USPQ 568, 574 (Fed. Cir. 1984).

The term "substantially" is often used in conjunction with another term to describe a particular characteristic of the claimed invention. It is a broad term. *In re Nehrenberg*, 280 F.2d 161, 126 USPQ 383 (CCPA 1960). The court held that the limitation "to substantially increase the efficiency of the compound as a copper extractant" was definite in view of the general guidelines contained in the specification. *In re Mattison*, 509 F.2d 563, 184 USPQ 484 (CCPA 1975).

All questions of enablement are evaluated against the claimed subject matter. The focus of the examination inquiry is whether everything within the scope of the claim is enabled.

Unless defined otherwise, all technical and scientific terms used herein have the same meanings as commonly understood by one of ordinary skill in the art to which the disclosed embodiments belong. Preferred methods, techniques, devices, and materials are described, although any methods, techniques, devices, or materials similar or equivalent to those described herein may be used in the practice or testing of the present invention.

Although Claims have been included in this Application to specific enumerated combinations of features, it should be understood that the scope of the present disclosure also includes any novel feature or any novel combination of features disclosed herein.

References "an embodiment," "example embodiment," "various embodiments," "some embodiments," etc., may indicate that the embodiment(s) so described may include a particular feature, structure, or characteristic, but not every possible embodiment necessarily includes that particular feature, structure, or characteristic.

Headings provided are for convenience and are not to be taken as limiting the present disclosure in any way.

Each term utilized herein is to be given its broadest interpretation given the context in which that term is utilized.

Terminology

The following paragraphs provide context for terms found in the present disclosure (including the claims):

The transitional term "comprising", which is synonymous with "including," "containing," or "characterized by," is inclusive or open-ended and does not exclude additional, unrecited elements or method steps. See, e.g., *Mars Inc. v. H.J. Heinz Co.*, 377 F.3d 1369, 1376, 71 USPQ2d 1837, 1843 (Fed. Cir. 2004) ("[L]ike the term 'comprising,' the terms 'containing' and 'mixture' are open-ended."). "Configured to" or "operable for" is used to connote structure by indicating that the mechanisms/units/components include structure that performs the task or tasks during operation. "Configured to" may include adapting a manufacturing process to fabricate components that are adapted to implement or perform one or more tasks.

"Based On." As used herein, this term is used to describe factors that affect a determination without otherwise precluding other or additional factors that may affect that determination. More particularly, such a determination may be solely "based on" those factors or based, at least in part, on those factors.

All terms of example language (e.g., including, without limitation, "such as", "like", "for example", "for instance", "similar to", etc.) are not exclusive of other examples and therefore mean "by way of example, and not limitation . . . ".

A description of an embodiment having components in communication with each other does not infer that all enumerated components are needed.

A commercial implementation in accordance with the scope and spirit of the present disclosure may be configured according to the needs of the particular application, whereby any function(s of the teachings related to any described embodiment of the present invention may be suitably changed by those skilled in the art.

Aspects of the present invention are described below with reference to flowchart illustrations and/or block diagrams of methods, and systems according to the disclosed embodiments. Each block of the flowchart illustrations and/or block diagrams, and combinations of blocks in the flowchart illustrations and/or block diagrams, can be implemented by various means.

The flowchart and block diagrams in the figures illustrate the architecture, functionality, and operation of possible implementations of systems and methods according to various embodiments. In this regard, each block in the flowchart or block diagrams may represent a segment which comprises one or more executable instructions for implementing the specified logical function(s). Functions noted in the block may occur out of the order noted in the figures. For example, two blocks shown in succession may, in fact, be executed substantially concurrently, or the blocks may sometimes be executed in the reverse order, depending upon the functionality involved.

Further, any sequence of steps that may be described does not necessarily indicate a condition that the steps be performed in that order. Some steps may be performed simultaneously.

The functionality and/or the features of a particular component may be alternatively embodied by one or more other devices which are not explicitly described as having such functionality/features. Also, various embodiments of the present invention need not include a device itself.

Where the power dock cradle system is described, it will be understood by those of ordinary skill in the art that: (i) the power dock cradle system will have a base structure. Above the base structure will be a plurality of power outlets. In addition, a cover with a cradle shaped area or U-like shape will be configured over the base and power outlets. Mobile devices and other items can be placed on the cover. In addition, other covers with different shapes without the U-like cradle shaped area can be positioned over the base and the power outlets. Any schematic illustrations of power dock cradle systems and accompanying descriptions of any sample power dock cradle systems presented herein are example arrangements for stored representations of information. Embodiments of the invention may also be implemented in one or a combination of power dock cradle systems.

More specifically, as will be appreciated by one skilled in the art, aspects of the present invention may be embodied as a system and/or method. Furthermore, aspects of the present invention may take the form of a plurality of covers of different shapes, such as a cover with a U-like cradle shaped area, and curved cover without the U-like cradle shaped area to store and charge mobile devices and also store other items as well.

Additionally, any uses of the phrase "configured to" or "operable for" can include generic structure that is manipulated to operate in a manner that is capable of performing the task(s) at issue. "Configured to" may also include adapting a manufacturing process to fabricate power dock cradle devices that are adapted to perform one or more tasks.

Introduction

The present invention provides cradle dock system for storing and charging mobile devices and storing small pocket-sized items such as keys and coins. With a cover with a cradle area, mobile devices can be securely positioned and charged within the U-like cradle shaped area of the cover. The U-like cradle shaped area can enable mobile devices to remain secure without sliding off, and allow the mobile devices to be charged by using the power outlets configured below the cover. A curved center region of the cover can be used to store such things like keys and coins on a center portion of the cover. The curved center region of the cover can ensure that the keys and coins remain securely in position on the cover without sliding off the cover.

The users can also change the cover of the cradle dock system from the cover with the U-like cradle shaped area to a cover without the U-like cradle shaped area. With the cover that does not have the U-like cradle shaped area, the users can store mobile devices in the center curved portion of the cover. In addition, small pocket-sized items such as keys and coins and other such items can be stored on the cover as well in a curved center region. These items can remain secure within the curved center region of the cover without the U-like cradle shaped area and without sliding or falling off of the cover.

System Structure

FIG. 1, illustrates a power solution cradle dock system (cradle dock system) 100 configured to hold one or more mobile devices and other items and to provide power and storage for one or more mobile devices, and storage for one or more items. The cradle dock system 100 includes a base 110 and a cover 120. The mobile devices can be placed on the cover 120 for temporary or permanent positioning. In addition, mobile devices can be placed on the cover 120 to be powered up. Above the base 110, outlets 130 and 135 are configured and illustrated. The outlets 130 and 135 are positioned between the base 110 and the cover 120. The outlets 130, 135 can be used to provide power to one or more mobile devices that are resting on the cover 120. In one embodiment, outlet 130 is a standard AC 120 v charging port and outlets 135 accommodates charging ports such as USB-A, USB-C, Thunderbolt® and/or similar types of mobile device charging cables.

Referring to FIG. 1, a mobile device 140 can be placed within the U-liked shaped or cradle area of the cover 120. The U-liked shaped area or cradle area of the cover 120 can provide a specific area on the cover 120 to position the mobile device 140 such as a phone. The U-like shaped area within the cover 120 acts as cradle area for the mobile device 140 to be securely held without falling off of the cover 120. As such, the U-like shaped area can enable the mobile device 140, and other hand-held devices or the like to be positioned safely on the cover. Moreover, the U-like shaped area, due to its configuration, can ensure that the mobile device 140 will not slide off the cover whenever the mobile device 140 is positioned within the cradle area of the cover 120. As such, if a user were to position and charge the mobile device 140, the U-liked shaped area can be a designated area on the cover 120 in which the mobile device 140 is placed and held securely whenever the user decides to place the mobile device 140 on the cover 120.

With respect to FIG. 1, additional mobile devices can also be placed within the U-liked shaped area. Moreover, multiple mobile devices can be placed within the cradle area to be stored and to receive power through the outlets 130, 135. Multiple mobile devices can be secured within the cradle or U-like shaped area can be configured to be either stored securely and/or receive power. Further, should the user desire to rest the mobile device 140 in a horizontal position, the user can also place the mobile device 140 in a center portion of the cover 120, and lay the mobile device 140 onto the cover 120. The mobile device 140 can also be rested on the center portion of the cover 120 that is away form the U-like cradle shaped area of the cover 120 while another mobile device can be positioned in the vertical direction in the U-like cradle shaped area of the cover 120. Further, a coin(s) 142 and keys 145 can also be positioned within the curved center portion of the cover 120. When the mobile device 140 is positioned on the cover 120, either on the center portion or the U-like cradle shaped area, the mobile device 140 can be charged. The mobile device 140 can be equipped with a cord, which can be plugged into one of the outlets 130, 135. In addition, the mobile device 140 can be wireless and charged wirelessly while being positioned on the cover 120 either in the U-like shaped area or on other portions of the cover 120.

In FIG. 1, the mobile device 140 is ideally placed in the U-like shaped area of the cover 120 to enable the mobile device 140 to be positioned securely within the cover 120 without using most of the area of the cover 120. In the U-like shaped area, the mobile device 140 can be secured safely while in a vertical position. The U-like cradle shaped area of the cover 120 can enable the mobile device 140 to be configured upright without moving away or out of the cover 120. The inner and outer dimensions of the U-like shaped area will provide the support for both sides of the mobile device 140 to ensure that the mobile device 140 remains within the U-like shaped area while being charged.

Referring to FIG. 1, should the user want to lay the mobile device 140 horizontally onto the cover 120, the mobile device 140 can be placed on the top portion of the cover 120 in the horizontal direction in the curved center region. The mobile device 140 can also be held securely while resting horizontally on the cover 120 in the curved center region.

In further embodiments, other objects other than the mobile device 140 can be placed on the cover 120. For instance, small-like objects such as the coins 142 and keys 145 can be placed on the cover 120 without the mobile device 140 resting on any portion of the cover 120.

Figure 2:
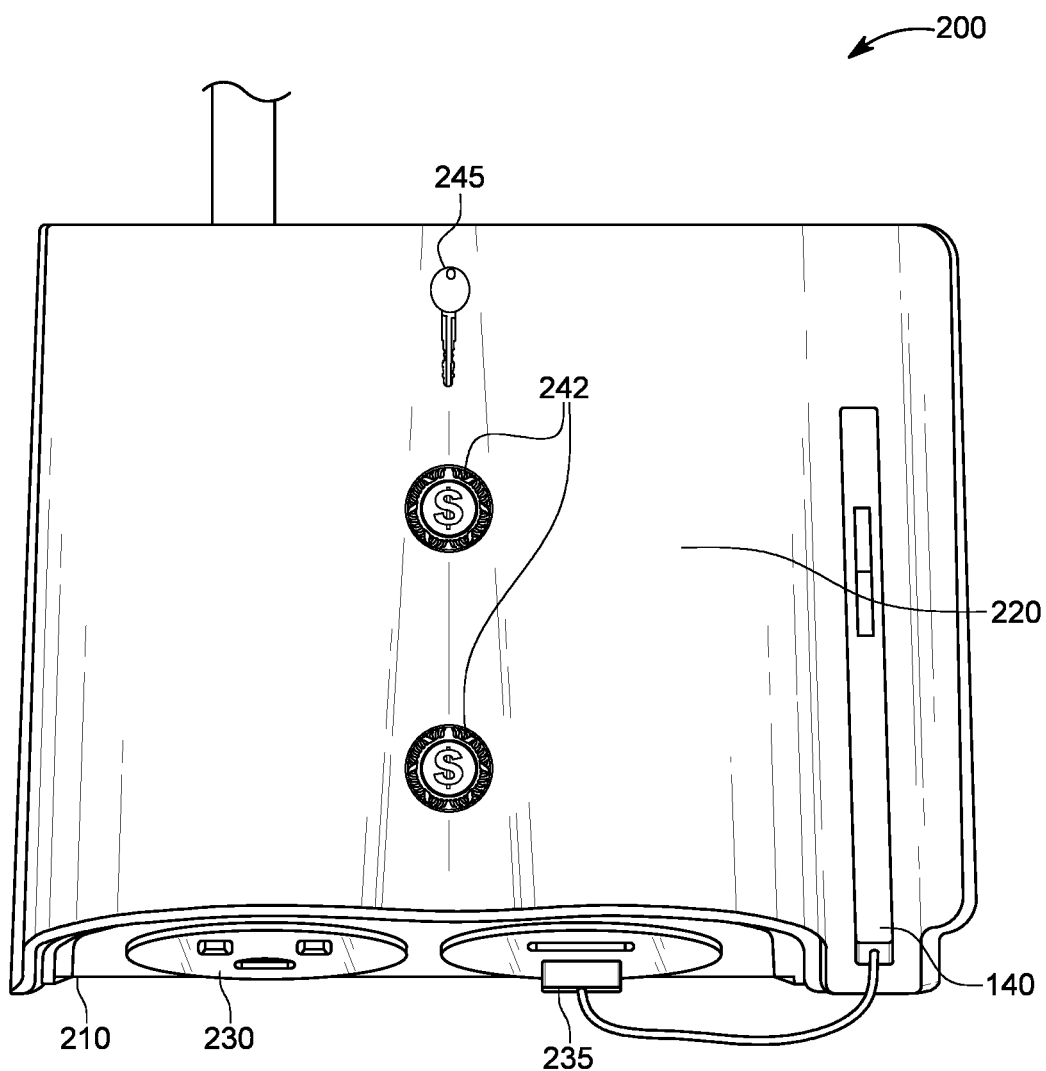
FIG. 2 illustrates another exemplary diagram of a power solution cradle dock system in accordance with an embodiment of the invention.

In FIG. 2, an embodiment of cradle dock system 200 is illustrated. The base 210 is illustrated along with the outlets 230, 235. The outlets 230, 235 can be used to provide power to items that are placed on the cover 220. The cover 220 is also illustrated. Unlike the embodiment described above, the cover 220 can be used to store items without any mobile devices or the like being located on the cover 220. In other words, the cover 220 can also store everyday and smaller-sized items like keys and coins within the center region of the cover 220. The cover 220 can be shaped to be curved within the center region to accommodate items to be better positioned on the cover 220. As such, given the curved shape within the center region of the cover 220, smaller-like items such as keys and coins and even pens and pencils can be placed on the cover 220.

Referring to FIG. 2, items such as coins 242 and keys 245 are illustrated to be on the curved center region of the cover 220. The coins 242 and keys 245 rest securely within the curved portion in the center region of the cover 220 without falling off of the cover 220. The curve region within the center of the cover 220 can ensure that the coins 242 and keys 245 will not slide into a U-like shaped cradle area of the cover 220, and/or slide off of the cover 220. The curved center region of the cover 220 enables the coins 242 and keys 245 to remain in position and not onto other regions of the cover 220.

With respect to FIG. 2, the user can also desire to place other items such as wallets, books, and pens on the cover 220. Depending on the user's preference or desire, the type of the cover 220 can be changed to accommodate the additional items in addition to the coins 242 and keys 245. As such, the user can decide to use the cover 220 to store items other than just to provide power to mobile devices described in FIG. 1, and can continuously change the type of the cover 220 to securely store items such as the coins 242 and keys 245. The user can also rearrange the position of the coins 242 and keys 245 on the cover 220 in the curved center region to provide space to place other items on the cover. Overall, the curved shape of the center region of the cover 220 can provide for a number of items in addition to the coins 242 and keys 245 be held securely onto the cover 220.

In other embodiments, the cover 220, 120 illustrated in FIGS. 1 and 2 can be removed. A user can decide to charge one or more electronic items without placing any of the items on the cover 120, 220 with the U-like shaped cradle area. As such, the user can decide to remove the cover 120, 220, and charge items using the power outlets of the cradle dock system on a different shaped cover. Accordingly, the cover 120, 220 can also be a removable item. The cover 120, 220 can be a removable item should one or more mobile devices need to be charged without the use of the U-like shaped cradle area, should the user desire to use a different shaped cover.

In other embodiments, as the cover is removed, it can be replaced with another cover of a different shape. Moreover, the cover for the cradle dock system 100, 200, 300 can also be removed and replaced with another cover of a different shape which does not include the U-like shaped cradle area./ As such, should the user want to simply rest mobile devices on the top portion of the cover, or place items such as keys and coins on the cover, the user can decide to replace the cover with the U-like cradle shaped area with a cover of a different shape that does not include the U-like cradle shaped area. A cover without the U-like cradle shaped area can still enable items such as keys and wallets and mobile devices to be placed on the cover. In addition, the cover can be secure to where the items such as the keys, coins, wallets, mobile devices, etc. can remain securely on the cover. Moreover, the mobile devices can be charged while positioned on the cover with a cord which can extend to the power outlets configured over the base. The other items such as wallets, keys, and coins can also rest securely within the top portion of the cover with the different shape.

Figure 3A:
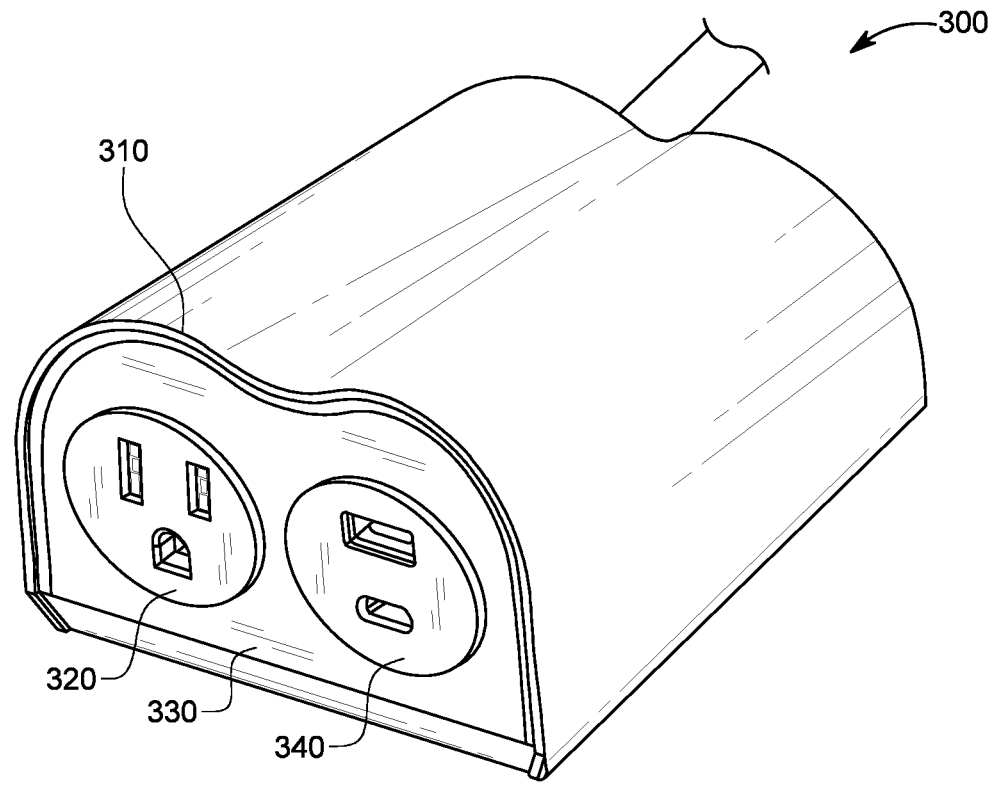
FIG. 3(a) further illustrates a diagram of a power solution cradle dock system in accordance with an embodiment of the invention.
Figure 3B:
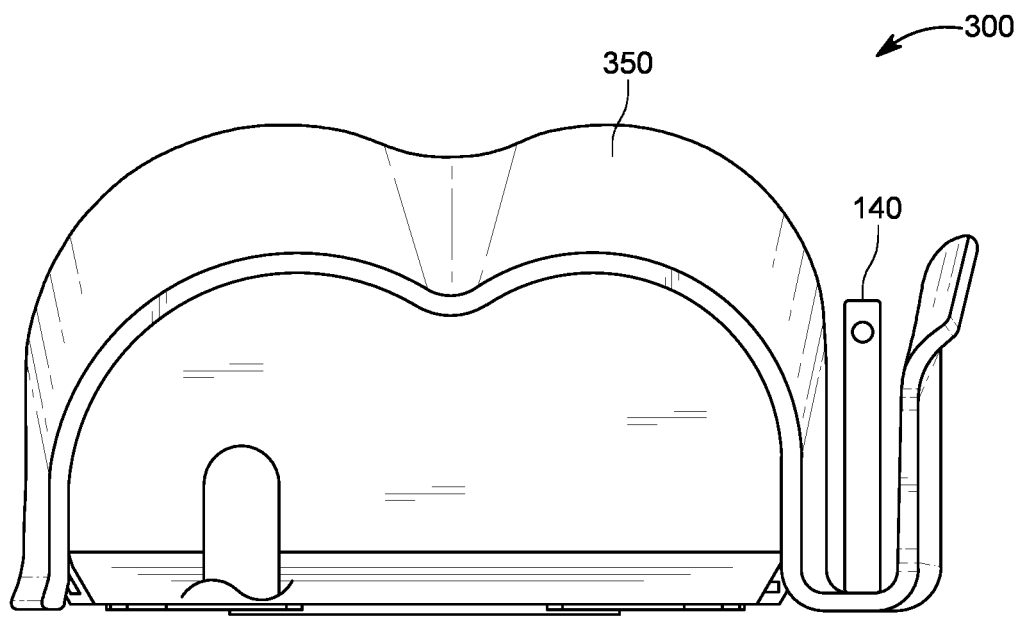
FIG. 3(b) illustrates another diagram of a cover of a power solution cradle dock system in accordance with an embodiment of the invention.

Referring to FIG. 3(A) and FIG. 3(B), a cradle dock system 300 is illustrated in which a cover 350 with a U-like cradle shaped area as in FIG. 1 is replaced with another cover 310 without a U-like cradle shaped area. The user may desire to replace the cover 350 with the cover 310 to put different items on the cover 310 in addition to mobile devices, or where the user may have a different preference with regard to the shape of the cover 310. As mentioned above, the items can include, coins, keys and wallets (wherein keys and coins are illustrated in FIG. 2). On the new cover 310, the user can charge mobile devices using cords and the outlets 320, 340 that are located above the base 330. Within the curved center portion of the cover, the mobile devices remain secure. The shape of the cover 310 has a curved slope on both sides within the center region to ensure that items within the center of the cover 310 can remain secure. In addition to mobile devices, the coins and keys demonstrated in FIG. 2 can also be placed within the center region of the cover 310. As such, the user preference for the cover 310, and the desire to use the center region of the cover 310 as opposed to the U-like cradle shaped region of the cover 350 can enable the cover 310 to be configured over the base 330 in place of the previous cover 350.

With reference to FIGS. 3(A) and 3(B), the user can also decide to put the original cover 350 back on if the user decides to use the U-like cradle shaped area of the cover 350 as opposed to the center portion of the cover 310. The user's desire to position items and mobile devices vertically or horizontally can determine whether the original cover 350 is used or the new cover 310 is used. As such, the user can interchange the covers 310, 350 respectively depending on the user's preferences with storing items and mobile devices. If the user wants to configure mobile devices in a vertical direction, the user can use the cover 350 with the U-like cradle shaped area that enables the mobile device to be configured in the vertical direction in the U-like cradle shaped area. In contrast, if the user wants to position the mobile devices horizontally, and also place other items with the mobile devices, the user can decide to replace the cover 350 with the cover 310 that does not have the U-like cradle shaped area. The user can accordingly use both covers 310, 350 interchangeably at varying intervals to accommodate the items and the way the user desires to store and position and also charge mobile devices.

Figure 4:
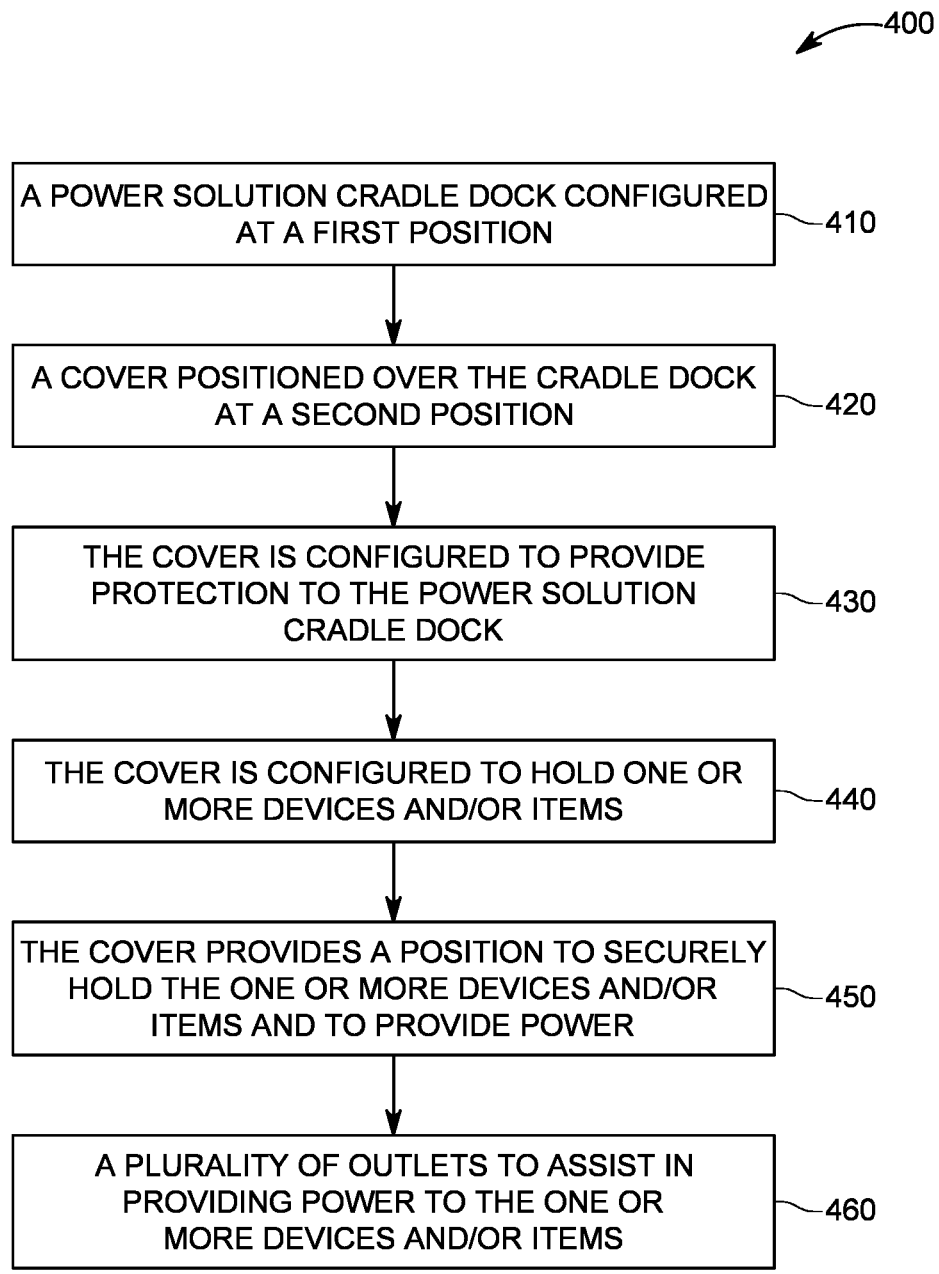
FIG. 4 illustrates a flowchart describing a process and use of the cradle dock system in accordance with an embodiment of the presently disclosed embodiments.

FIG. 4 illustrates a method and process for the cradle dock system described above in FIGS. 1-3(B). The user can use a variety of covers on the cradle dock system. In addition, the user can store mobile devices and a variety of other items such as keys and coins (described in FIG. 2). The user can use covers interchangeably over the base of the cradle dock system to store and charge mobile devices, and also store a variety of other items such as keys and coins.

In FIG. 4 at step 410, a power solution cradle dock is configured at a first position within the medium or system. The cradle dock provides an area for users to position mobile devices such as cell phones and tablet devices to be stored and to be charged. The power solution cradle dock can be positioned on any desk or work table to provide an area to store and charge mobile devices.

In FIG. 4, at step 420, a cover is configured over the power solution cradle dock in a second position. The cover includes a U-like cradle shaped area at the right end of the cover. In the U-like cradle shaped area of the cover, mobile devices can be stored. Users can configure mobile devices such as cell phones in the vertical direction in the U-like cradle shaped area. The cell phones and other mobile devices can be stored within the U-like cradle shaped area, and also charged within the U-like cradle shaped area. The mobile devices can have cords which extend to outlets configured below the U-like cradle shaped area to charge the mobile devices. In addition, the power solution cradle dock can provide an area to store items such as keys and coins. The U-like cradle shaped area can store the mobile device in a vertical direction. The center curved region of the cover can thereby store items such as keys and coins.

With respect to FIG. 4, at step 430, the cover is configured to provide protection to the cradle dock. The cover protects what is configured underneath such as the base of the cradle dock and the power outlets. Accordingly, the cover protects the base from any potential damage and also the power outlets that can be used to charge the mobile devices stored on the cover.

In FIG. 4, at step 440, the cover is configured to hold one or more mobile devices and items. The cover can hold the mobile devices in the U-like cradle shaped area at the right end of the cover. The mobile devices can be configured in the vertical direction, and have a cord that extends to one or more of the power outlets to charge the mobile devices. For items such as keys and coins, the curved center portion of the cover outside of the U-like cradle shaped area can be used to position items such as keys and coins. The curved center portion of the cover can be used to position keys and coins. The curved center portion of the cover can also be used to position mobile devices in the horizontal direction. In other embodiments, different covers with different shapes can be used to store items such as keys and coins, wherein the different covers will not include the U-like cradle shaped area.

In FIG. 4, with respect to step 450, the cover is configured to securely hold one or more devices and items and enable the one or more devices and items to receive power. The cover is configured to hold the mobile devices in the U-like cradle shaped area, or the curved center region, so that the mobile devices can be recharged using the power outlets configured over the base. The mobile devices can be securely held vertically in the U-like cradle shaped area of the cover. In addition, the mobile devices can be held securely horizontally in the curved center region in the center portion of the cover. In either configuration, the mobile device can be charged while positioned on the cover by using the power outlets positioned below the cover.

In FIG. 4, with respect to step 460, a plurality of power outlets are configured to provide power to one or more mobile devices and/or items. The power outlets are configured over the base of the cradle dock. Mobile devices configured either on the curved center portion of the cover or the U-like cradle shaped area of the cover can be charged using the power outlets. Power cords can extend from the mobile devices to the power outlets to charge one or more mobile devices configured on the cover.

The cradle dock system described in FIGS. 1-4 can provide a safe and efficient way to charge and store a plurality of mobile devices. Mobile devices can be positioned within the U-like cradle shaped area of the cradle dock system and be held securely and charged from the cradle area. The curved center portion of the cover can also be used to place items such as keys and coins, wherein the curved center region of the cover can ensure that the keys and coins will remain positioned on the cover, and not slide off of the cover. The cover can also be taken off of the cradle dock system.

In FIGS. 1-4, users can also decide to use a cover with a different shape than the cover with the U-like cradle shaped area. Users who would like to put items and mobile devices onto the cover without the U-like cradle shaped area, can exchange the cover with the U-like cradle shaped area with a cover without the U-like cradle shaped area. As such, the new cover without the U-like cradle shaped area can be used to store mobile devices in the horizontal direction and also items such as keys and coins. The new cover without the U-like cradle shaped area can also hold the mobile devices securely in a curved center region of the cover and enable the mobile device to be charged using the power outlets configured below the cover. The new cover can also hold items such as keys and coins securely in a curved center region without the keys and coins falling of the new cover.

Those skilled in the art will appreciate that the example embodiments are non-exhaustive and that embodiments other than that described here may be included without departing from the scope and spirit of the presently disclosed embodiments.

Advantages

Disclosed embodiments relate to methods and systems for storing mobile devices and items on a cradle dock system with a cover with a U-like cradle shaped area, and on covers of different shapes without the U-like cradle shaped area. By incorporating the cover with the U-like cradle shaped area, and the covers without the U-like cradle shaped area, users can store mobile devices securely, but also store other every day items such as keys and coins, and also remove the cover when desiring to change covers or save additional space.

An advantage of the cover with the U-like cradle shaped area is that mobile devices can be positioned vertically in the cradle area, not not fall off of the cover due to the cradle area. In addition, the mobile devices can be securely charged in the U-like cradle shaped area of the cover.

An advantage of not using the U-like cradle shaped area is that items such as keys and coins can be stored on the covers in the curved center region without sliding off of the covers. The curved center region is depicted to include a first curve when viewed from a face of the outlet, the curved center region extends from the first curve and extends opposite of a direction of the face of the outlet to a second narrower curve when viewed from the face of the outlet. The keys and coins will not slide down to the U-like cradle shaped area of the cover from the curved center region, and or slide off of the cover. In addition, mobile devices can also be stored securely on such covers when they are positioned horizontally on the cover in the curved center region, and also not slide off the cover as a result.

Accordingly, the present invention seamlessly and efficiently operates a cradle dock system that can store and charge mobile items securely. In addition the present invention illustrates a cradle dock system that can store and charge mobile devices on various covers of different shapes and also store items such as keys and coins securely on the various covers of different shapes.

CONCLUSION

All references, including granted patents and patent application publications, referred herein are incorporated herein by reference in their entirety.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Various aspects of the invention have been described above by way of illustration, and the specific embodiments disclosed are not intended to limit the invention to the particular forms disclosed. The particular implementation of the cylinder system provided thereof may vary depending upon the particular context or application. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

The corresponding structures, materials, acts, and equivalents of all means or step plus function elements in the claims below are intended to include any structure, material, or act for performing the function in combination with other claimed elements as specifically claimed.

What is claimed is:

1. A system comprising:
a power solution cradle dock configured at a first position;
a cover positioned over the power solution cradle dock at a second position, wherein the cover is positioned over the power solution cradle dock to provide protection for the power solution cradle dock, wherein the cover is configured with a curved center region and a U-like shape to hold a device, and wherein the cover provides a position to enable the device to be held securely and receive power; and
an outlet configured to assist the power solution cradle dock and the cover to provide the power to the device, the curved center region includes a first curve when viewed from a face of the outlet, the curved center region extends from the first curve and extends opposite of a direction of the face of the outlet to a second narrower curve when viewed from the face of the outlet.

2. The system of claim 1, wherein the curved center region is configured to store a coin.

3. The system of claim 1, wherein the cover is removable from the power solution cradle dock.

4. The system of claim 1, wherein the cover is configured to be interchangeable with another cover with a different shape.

5. The system of claim 1, wherein the U-like shape of the cover includes a groove.

6. The system of claim 1, wherein the curved center region is configured to store an item.

7. The system of claim 1, further comprising a second cover for the power solution cradle dock, wherein the second cover is not configured with a U-like shaped area.

8. A system comprising:
a cover configured with a curved center region and a U-like shaped cavity, wherein the cover is configured over a power solution cradle dock to provide protection to the power solution cradle dock, wherein the cover is configured to hold a device, and configured to be exchanged with an additional cover and work with the additional cover;
the power solution cradle dock configured underneath the cover to be protected by the cover and provide power to the device positioned on the cover; and
an outlet configured within the power solution cradle dock to enable the power solution cradle dock to provide the power to the device on the cover, the curved center includes a first curve when viewed from a face of the outlet, the curved center region extends from the first curve and extends opposite of a direction of the face of the outlet to a second narrower curve when viewed from the face of the outlet.

9. The system of claim 8, wherein the U-like shaped cavity of the cover enables the device to be positioned at any position within the U-like shaped cavity.

10. The system of claim 8, wherein the curved center region of the cover is curved to hold a key or a coin.

11. The system of claim 8, wherein the cover is replaced with the additional cover over the power solution cradle dock.

12. The system of claim 8, wherein the cover is exchangeable with other additional covers.

13. The system of claim 8, wherein the cover is removable from over the power solution cradle dock to enable the power solution cradle dock to be configured without the U-like shaped cavity.

14. The system of claim 8, wherein the cover is configured to hold a key or a coin away from the U-like shaped cavity.

15. A method comprising:
configuring a power solution cradle dock at a first position;
positioning a cover at a second position, wherein the cover is positioned over the power solution cradle dock to provide protection for the power solution cradle dock, wherein the cover is configured with a curved center region and a U-like shape to hold a device, and wherein the cover provides a position to enable the device to be held securely and receive power; and
configuring an outlet to assist the power solution cradle dock and the cover to provide the power to the device, the curved center region includes a first curve when viewed from a face of the outlet, the curved center region extends from the first curve and extends opposite of a direction of the face of the outlet to a second narrower curve when viewed from the face of the outlet.

16. The method of claim 15, wherein the curved center region is configured to store a coin or key.

17. The method of claim 15, wherein the U-like shape of the cover provides an additional position to place the device on the cover.

18. The method of claim 15, wherein the device is positioned on the U-like shape of the cover and an item is positioned in the curved center region.

19. The method of claim 15, further comprising:
configuring another cover over the power solution cradle dock, wherein the another cover is not configured with a U-like shaped area.

20. The method of claim 15, wherein the device is positioned on a right end or a center portion of the cover.

* * * * *